(12) United States Patent
Smith

(10) Patent No.: US 7,051,164 B2
(45) Date of Patent: May 23, 2006

(54) COHERENCE-FREE CACHE

(76) Inventor: Neale Bremner Smith, 40 Royal Oak, Alnwick, Northumberland, NE662DA (GB)

( * ) Notice: Subject to any disclaimer, the term of this patent is extended or adjusted under 35 U.S.C. 154(b) by 119 days.

(21) Appl. No.: 10/312,117

(22) PCT Filed: Jun. 22, 2001

(86) PCT No.: PCT/GB01/02778

§ 371 (c)(1),
(2), (4) Date: Mar. 28, 2003

(87) PCT Pub. No.: WO01/98907

PCT Pub. Date: Dec. 27, 2001

(65) Prior Publication Data

US 2003/0163648 A1    Aug. 28, 2003

(30) Foreign Application Priority Data

Jun. 23, 2000    (GB) ................................ 0015276.9

(51) Int. Cl.
*G06F 12/00* (2006.01)

(52) U.S. Cl. ..................... 711/141; 711/145; 711/130

(58) Field of Classification Search ................ 711/118, 711/121, 130, 138, 141–145, 147, 173; 718/107–108
See application file for complete search history.

(56) References Cited

U.S. PATENT DOCUMENTS

| | | | |
|---|---|---|---|
| 5,737,757 A * | 4/1998 | Hassoun et al. ............. | 711/145 |
| 5,787,490 A * | 7/1998 | Ozawa ........................ | 711/173 |
| 5,809,522 A | 9/1998 | Novak et al. | |
| 5,974,438 A * | 10/1999 | Neufeld ....................... | 718/104 |
| 6,253,290 B1 * | 6/2001 | Nakamoto ................... | 711/138 |
| 2002/0051536 A1 * | 5/2002 | Shirakawa et al. ........... | 380/45 |

FOREIGN PATENT DOCUMENTS

| | | |
|---|---|---|
| EP | 0 453 028 A2 | 10/1991 |
| WO | WO 01/88695 A2 | 11/2001 |
| WO | WO 01/88696 A2 | 11/2001 |
| WO | WO 01/88712 A2 | 11/2001 |

OTHER PUBLICATIONS

L Choi, et al., "Compiler and Hardware Support for Cache Coherence In Large-Scale Multiprocessors:Design Considerations and Performance Study",Proceedings of the 23rd Annual Symposium on Computer ARchitecture, May 1996, pp. 283-294, ACM/IEEE, US.

"Caching Scheme for Managing Task Migration Sharing", IBM Technical Disclosure Bulletin, vol. 34, No. 2, Jul. 1991, pp. 144-145, IBM Corp, New York, US.

"Access Authorization for Cache Coherence Control", IBM Technical Disclosure Bulletin, vol. 33, No. 11, Apr. 1991, pp. 306-307, IBM Corp, New York, US.

* cited by examiner

*Primary Examiner*—Nasser Moazzami
(74) *Attorney, Agent, or Firm*—Shalom Wertsberger; Saltamar Innovations

(57) ABSTRACT

The present invention relates to a cache (10) and system and method of maintaining cache coherency in a parallel processing system, by tagging (13) cached data (11) with the identity of the users or process threads which have access rights to the data. Cache users may see a cache miss even if the data is in the cache, unless they have access rights. The tags can be reset to disallow further access on thread transfer or at the point of synchronisation of process threads.

20 Claims, 3 Drawing Sheets

COHERENCE-FREE CACHE

Figure 1:
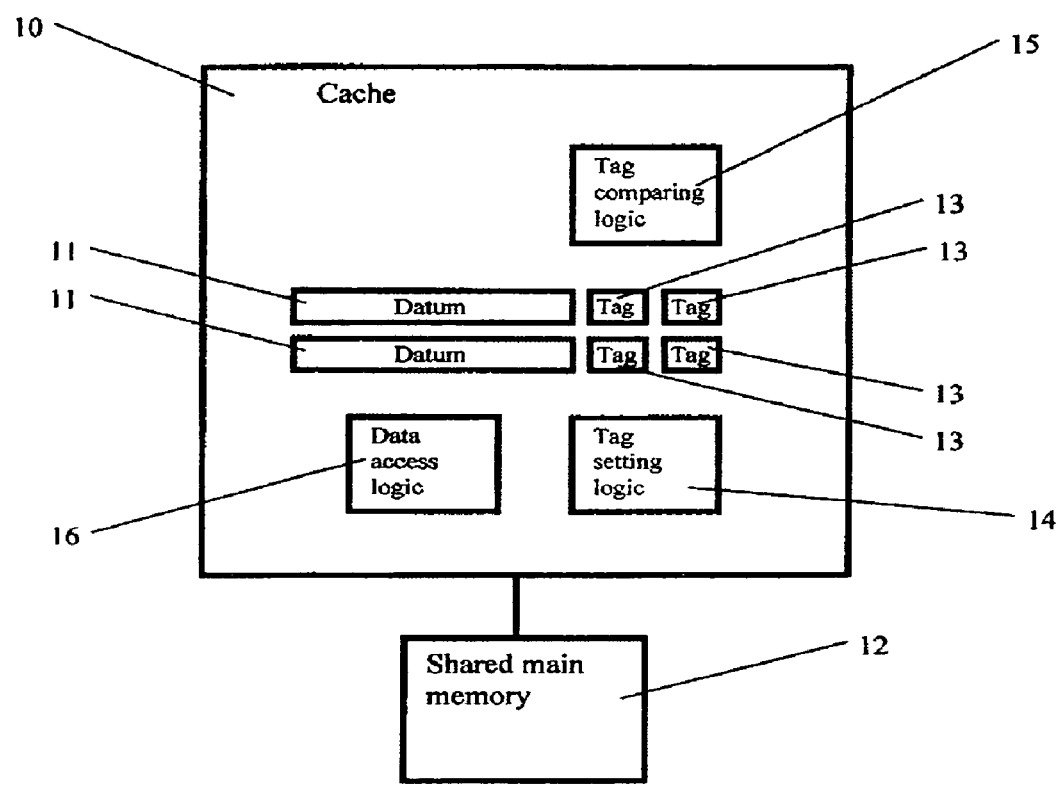

This invention relates to a mechanism for performing independent caching of shared data (i.e. information of any form) in multiple places within a parallel processing system.

Caches are devices or mechanisms in a system (e.g. a computer system) which typically hold copies of parts, or all, of the data (i.e. information of any form) held in a remote shared data store (hereafter referred to as the 'core storage') and are located close to the user (e.g. a processing thread) of that data, typically so as to allow faster access to that data. When that data is shared between two or more users and copies exist in one or multiple caches simultaneously then problems can arise when one user changes the data, since other users need to see those changes too. Maintaining up-to-date data in each cache is known as maintaining "cache coherency".

Many ways of maintaining cache coherency are possible, but there are three common methods, each of which has disadvantages: One is to communicate the changes to all affected caches. This is very expensive in terms of time and infrastructure if changes are very frequent. Another method is for users to identify, in advance, potential points in time when caches may contain incorrect data for whatever reason, and schedule explicit "cache synchronisations" in which either changes are communicated to all other affected caches or the affected caches are flushed. This is difficult to implement well because the scheduling is dependent on what work needs to be done and this needs to be analysed before starting work. Another method is to ensure that if a datum is to be modified then only one copy of it exists in the system. This reduces the potential for sharing data, so if the datum is shared by a lot of users then time is spent moving the datum around between them.

It would be advantageous for a cache to allow removal of the visibility of the cache from the users, while not requiring expensive communication between caches, and to allow many users to have simultaneous access to writeable data. Within this document, the statement of invention and claims, the term 'access' to cached data refers to the ability to perform read, write, read/write or any combination of these operations.

It would be further advantageous for a cache to permit selective access to users who are entitled to use and modify cached data, while refusing access to other users of the cache.

It is an object of the present invention to provide a cache and method of maintaining cache coherency in a shared memory parallel processing system.

According to a first aspect of the present invention, there is provided a cache for use in caching data from shared memory in a parallel processing system characterised in that said cache comprises at least one tag associated with said cached data.

Preferably at least one tag comprises information relating to the access of said cached data selected from a list comprising:
  the identity of a processing thread;
  the identity of a user;
  the identity of a processor; and
  a null value.

More preferably said information relating to the access of said cached data identifies an entity permitted to access the cached data, or optionally which has previously modified the cached data.

Preferably the cache further comprises a tag setting means for modifying the contents of said at least one tag.

More preferably said cache further comprises tag comparing means for comparing the contents of said at least one tag with the identity of the requester of access to said cached data, and a data access means responsive to said tag comparing means for providing access to said cached data.

Typically, there is provided a parallel processing system comprising:
  at least one processor;
  shared memory; and
  at least one cache.

Typically, each processor has exclusive use of its own cache.

According to a second aspect of the present invention, there is provided a method of caching data in a cache from shared memory in a parallel processing system comprising the step of caching data fetched from a shared memory in said cache characterised in that said cache comprises at least one tag associated with said cached data.

Typically the method further comprises the step of writing data from said cache to said shared memory.

Preferably at least one tag comprises information relating to the access of said cached data selected from a list comprising:
  the identity of a processing thread;
  the identity of a user;
  the identity of a processor; and
  a null value.

More preferably, said information relating to the access of said cached data identifies an entity permitted to access the cached data.

Preferably the method further comprises the step of a tag setting means modifying the contents of said at least one tag.

Optionally, said tag setting means sets said at least one tag to the identity of the requestor of a cache access.

Optionally, said tag setting means sets said at least one tag to the identity of a plurality of the processes active on a processor.

Optionally, said tag setting means sets said at least one tag to a null value.

Optionally, the method of caching data further comprises the steps of:
  comparing the contents of said at least one tag with the identity of the requester of access to said cached data; and
  depending on the results of said comparison, providing access to said cached data Optionally, the method of caching data further comprises the steps of:
  comparing the contents of at least one tag whose contents identify an entity which has previously accessed the cached data with the contents of another tag within said cache; and
  depending on the results of said comparison, writing data from said cache to said shared memory.

Figure 2:
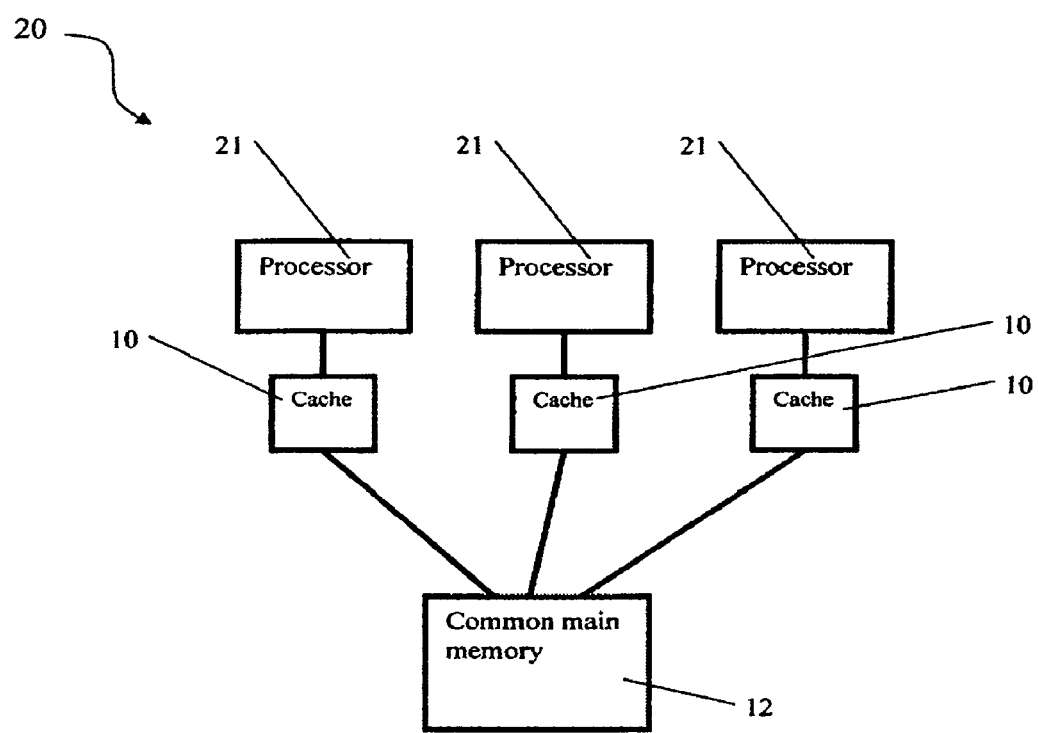
Figure 3:
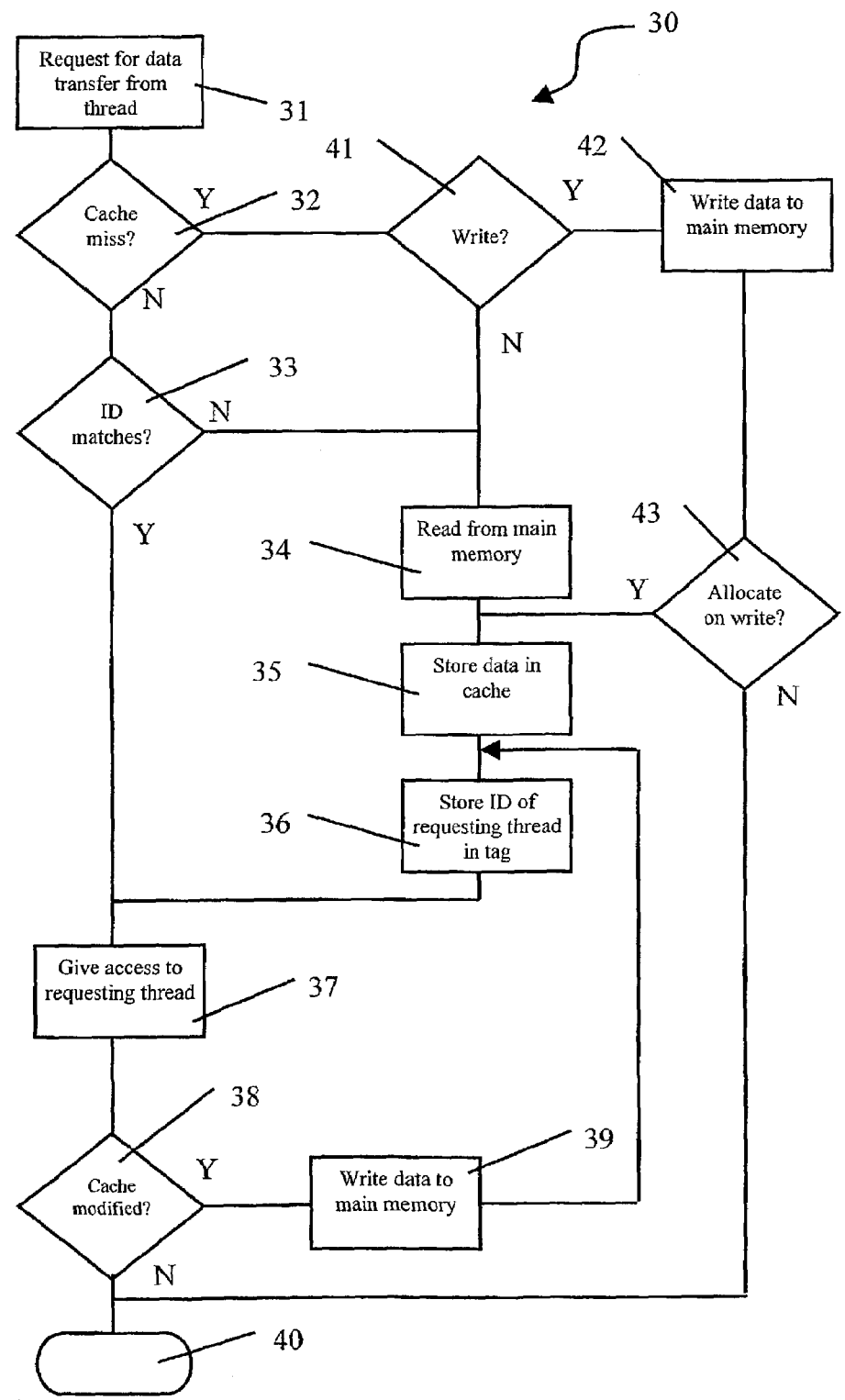

In order to provide a better understanding of the present invention, an embodiment will now be described by way of example only and with reference to the accompanying Figures, in which:

FIG. 1 illustrates, in schematic form, a cache in accordance with the invention; and FIG. 2 illustrates, in schematic form, a multi-processing parallel processing system in accordance with the invention; and FIG. 3 illustrates a flowchart describing the response to a request for information from a process thread in accordance with the invention.

The invention is a cache which functions to maintain cache coherence in a shared memory parallel processing system.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code of intermediate source and object code such as in partially compiled form suitable for use in the implementation of the processes according to the invention. The carrier may be any entity or device capable of carrying the program.

For example, the carrier may comprise a storage medium, such as ROM, for example a CD ROM or a semiconductor ROM, or a magnetic recording medium, for example, floppy disc or hard disc. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

With reference to FIG. 1, the cache 10 is implemented in digital logic and comprises cached data 11, which is from a shared main memory 12. The cache also comprises RAM memory tags 13 associated with the RAM memory cached data and tag setting logic 14 for setting or modifying the contents of the tags, a tag comparing logic 15 for comparing the contents of the tag with the identity of entities requesting data from the cache, and a data access logic 16 for providing permitted entities with access to data in the cache.

All of these "coherence-free caches" in a system can be completely independent, self-contained, and need no information about what any other parts of the system are doing, yet allow data to be shared and changes to be visible to all concerned.

When multiple users are concurrently active we can assume they are operating asynchronously. When a user accesses data it is important that they see their transactions occurring in a correct order. The transactions of each user may be interleaved with the transactions of the other users, and since the users are asynchronous the interleaving can be assumed to be indeterminate. If one user needs to know when a certain set of transactions of another user has been completed before it attempts to generate more transactions for itself, then those users perform a "time synchronisation" (e.g. a barrier synchronisation, and not to be confused with a cache synchronisation).

Between time synchronisations each user need have no knowledge of what the other users are doing, nor when they are doing it. It can therefore be assumed that each user does not know if the data it is using is being modified by any other users. In this respect we can safely assume that if no time synchronisation is performed then any modification of shared data is irrelevant and can be ignored. This means that, at the very least, there is no need to communicate any data changes to other caches until a time synchronisation occurs.

When a user is allowed to access a datum in a cache this is herewith defined as an "access right" to that datum. A user has "access" to a cache (but not necessarily to the data in the cache) if the user can potentially read, write, or modify data within that cache.

If a user attempts to access data and a copy of that data is held in the cache then it may only access the cached copy if it has access rights to that data. If it does not have access rights then it must access the core storage instead.

Cached data is associated with its users in order to determine access rights. Such association may typically be implemented by "tagging" each datum in the cache with information identifying the users which have valid access rights to that datum. If, for example, each user has a unique identification code, then a representation of a user's code can be tagged onto the data for which it has access rights. Such a tag may also contain additional information about the access or usage of data. Note that core storage need not have any knowledge of such associations.

It is permissible for more than one user to have access rights for any single datum. It is also permissible to have a datum, or data, for which no users have access rights. Also, not all data need be associated with its users; such a non-associative arrangement can typically improve storage density if the coherence-free caching scheme is not required for some data, e.g. for read-only constants.

When a synchronisation occurs we need only ensure that both the core storage is up-to-date and that the synchronising users lose access rights to any cached data which is potentially shared between them. Depending on the behavior required it may also be desirable to remove access rights for other or all users, not only those synchronising.

When data is taken from core storage and placed in a cache then the data can be assumed to be sufficiently up-to-date and the user (if any) which requested the data can then be given access rights to the cached data. If desired the data can also be made accessible to all current users of that cache.

When a user first starts using a cache it typically has no access rights to any of the data in that cache. This ensures that the user must go to core storage and therefore collect up-to-date data.

It is possible for a user to start off at the same point as another user, in which case it is possible, but not necessary, for that user to inherit all the access rights to data from the original user, though from that point onwards the two users are typically considered independent.

If a user migrates from the domain of one cache into the domain of another cache then it will typically lose access to any cached data in the first cache. This ensures that if the migrated user returns to the first cache it can not see the potentially out-of-date data. It may also be desirable for other users to also lose access to some or all of the data that they share with the migrating user.

If a user terminates its use of a cache then it will typically lose access to any data within that cache. This ensures that if the user reappears then it cannot access potentially out-of-date data. It may also be desirable for other users to also lose access to some or all of the data that they share with the terminating user.

If a user modifies data which is held in the cache to which it has access then that change should be forwarded to core. storage prior to a synchronisation or migration. One way to ensure this is to forward the changes as they occur, though the changes can be forwarded at a later date if so wished. It is permissible to not forward changes which can be assumed to give an indeterminate value to the data (either before or after the synchronisation), or for data which is no longer required.

Data can be speculatively fetched (also known as "prefetching") without harm. This allows multiple data to be fetched on any single datum access, typically to exploit any form of additional or improved communication capacity within the data storage system or subsystem on the assumption that the user will require that data in the near future. The speculatively fetched data would typically be associated to one or more users as if the user had requested the data without a synchronisation occurring.

If a user has modified a datum in a cache and then attempts to perform an atomic operation (an indivisible read-modify-write) on that same modified datum without having performed a synchronisation, then the atomic operation can occur directly on the datum within the cache without having to notify core storage, any other users, any other caches, or indeed anything external to the affected cache itself. Typically the datum is associated with the user(s) as if the operation was non-atomic.

There are many ways to implement a coherence-free cache with varying degrees of complexity and performance. We present here one possible example of a tagging method. Other methods, using tags or otherwise, can be used and the behavior will change accordingly. The example given is in the context of a computer system, but can also be applied to other systems.

With reference to FIG. 2, in this example of a basic coherence-free cache in a shared-memory multithreading multiprocessor computer system 20 there is a collection of processors 21 which share a common main memory 12. Each processor has its own single coherence-free cache 10 and can execute multiple threads simultaneously, with all those threads able to have access to the cache. A thread is analogous to a "user" and the shared main memory is analogous to the "core storage". The processor is the domain served by its cache, and hence the threads being executed by that processor are in the domain served by that cache.

There is a mechanism to allow migration of a thread from one processor to another. The cache will typically be either write-through or write-back and fulfil the appropriate forwarding requirements. Threads have identification codes each of which are unique within the processor on which they are running.

With reference to the flowchart 30 of FIG. 3, when a thread requests data transfer 31 and there is a cache miss 32 then if the transfer is a read 41 the data is fetched from main memory 34 and placed into the cache 35. The datum in the cache is then tagged 36 at least by the identification code of the requesting thread, or more optimally by the identification codes of all active threads within the same processor. All the threads whose codes have been tagged to the datum gain access rights to that datum 37. If there is a cache miss 32 and the requested transfer was a write 41 then the data is written to main memory 42 and in the case of an allocate on write condition 43, the data is stored in the cache 35.

A synchronisation can be defined by the use of an indivisible (read-modify-write) operation on a memory datum. Better definitions are possible, but this is sufficient for this example.

When a synchronisation occurs then the threads performing the synchronisation lose their access rights to all the data in the caches of their respective processors.

If any thread requests access to data, and that data is in the cache, then that thread will effectively see a cache miss if it fails to have access rights to that data 33. A cache hit will occur only if the data is present in the cache and the requesting thread has access rights to that data 37.

If a cache hit occurs and the data is not modified then no changes to the access rights of the datum occur 40.

If a cache hit occurs and the data becomes modified 38 by at least one thread then after writing back to the shared core memory 39 changes to access rights are made 36 in the same way as if a cache miss had occurred.

If a thread terminates or migrates away to a different processor then all threads lose access rights to any data to which the terminating or migrating thread had access rights.

It is permissible, but not a necessity, to allow hereditary access rights. If a thread (the "parent") spawns another thread (the "child") on the same processor then the child can acquire access rights to all the data to which the parent has access rights.

Further modifications and improvements may be added without departing from the scope of the invention herein described.

The invention claimed is:

1. A method of caching shared data while maintaining cache coherency in a cache from shared memory in a parallel processing system, said cache comprising plurality of tags associated with cached datum of said shared data, the method comprising the steps of:
    caching a datum fetched from said shared memory in said cache;
    setting said plurality of cache coherency tags with information relating to the access of said cached datum, wherein said cached datum is contemporaneously tagged with information relating to the access of said cached datum by more than one entity, wherein one of said entities may find a hit in said cache but reject the use of the cached datum based on the content of a tag.

2. A method as claimed in claim 1 further comprising the step of writing data from said cache to said shared memory.

3. A method as claimed in claim 1 wherein said information relating to the access of said cached datum is selected from a list comprising:
    the identity of a processing thread;
    the identity of a user;
    the identity of a processor; and
    a null value.

4. A method as claimed in claim 1 wherein said information relating to the access of said cached datum comprises the identity of the requestor of a cache access.

5. A method as claimed in claim 1 wherein said information relating to the access of said cached datum comprises the identity of an entity permitted to access the cached data.

6. A method as claimed in claim 1 wherein said information relating to the access of said cached datum comprises the identity of an entity that has previously accessed the cached data.

7. A method as claimed in claim 1 wherein said information relating to the access of said cached datum comprises the identity of a plurality of the processes active on a processor.

8. A method as claimed in claim 1 which further comprises the steps of:
    comparing the contents of said plurality, of tags with the identity of a requester of access to said cached data; and
    depending on the results of said comparison, providing access to said cached datum.

9. A method as claimed in claim 1 which further comprises the steps of:
    comparing the contents of said plurality of tags with the contents of another tag within said cache; and
    depending on the results of said comparison, writing data from said cache to said shared memory.

10. A cache for use in caching shared data from shared memory in a parallel processing system, said cache comprising plurality of cache coherency tags associated with cached datum of said shared data, said tagscomprising information relating to the access of said cached datum, wherein a chached datum is contemporaneously tagged with information relating to the access of said cached datum by more than one entity, wherein one of said entities may find a hit in said cache but reject the use of the cached datum based on the content of a tag.

11. A cache as claimed in claim 10 wherein said information relating to the access of said cached datum is selected from a list comprising:
the identity of a processing thread;
the identity of a user;
the identity of a processor; and
a null value.

12. A cache as claimed in claim 10 wherein said information relating to the access of said cached datum comprises the identity of the requestor of a cache access.

13. A cache as claimed in claim 10 wherein said information relating to the access of said cached datum comprises the identity of an entity permitted to access the cached datum.

14. A cache as claimed in claim 10 wherein said information relating to the access of said cached datum comprises the identity of an entity which has previously accessed the cached datum.

15. A cache as claimed in claim 10 wherein said information relating to the access of said cached datum comprises the identity of a plurality of the processes active on a processor.

16. A cache as claimed in claim 10 which further comprises a tag setting means for modifying the contents of said plurality of tags.

17. A cache as claimed in claim 10 which further comprises:
a tag comparing means adapted to compare the contents of said plurality of tags with the identity of the requester of access to said cached datum; and
a data access means adapted to provide, responsive to said tag comparing means, access to said cached datum.

18. A cache as claimed in claim 10 which further comprises:
a tag comparing means adapted to compare the contents of said plurality of tags with the contents of another tag within said cache; and
a data writing means adapted to write, responsive to said tag comparing means, data from said cache to said shared memory.

19. A parallel processing system comprising:
A plurality of processors;
shared memory; and
at least one cache as claimed in claim 10.

20. A system as claimed in claim 19 wherein each processor has exclusive use of its own cache.

* * * * *